July 15, 1924.

J. D. HARTWIG 1,501,112

SAW SET AND JOINTER

Filed Jan. 17, 1924      2 Sheets-Sheet 1

Inventor
J. D. Hartwig.
By Jacobi & Jacobi
Attorneys

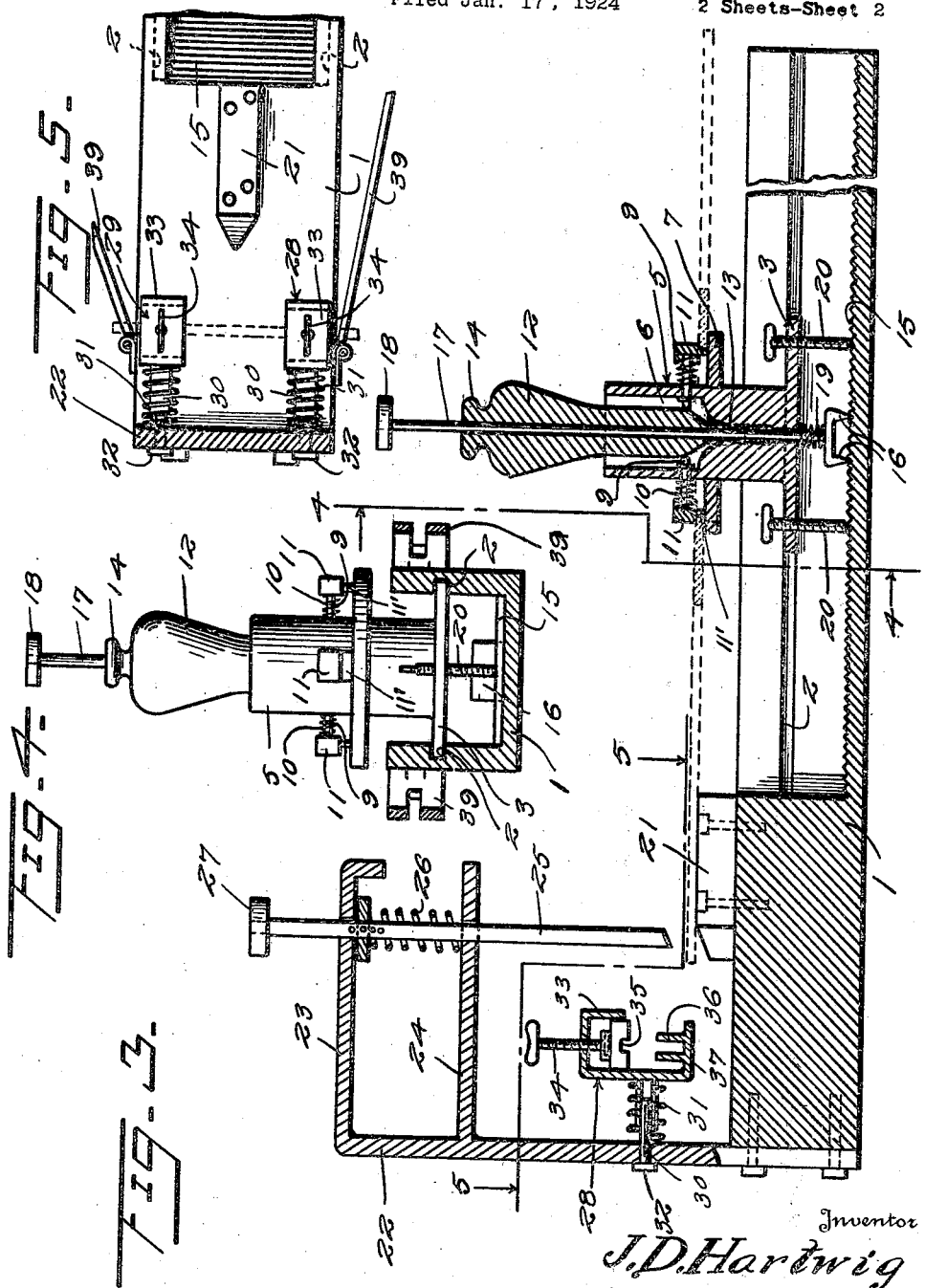

Patented July 15, 1924.

1,501,112

UNITED STATES PATENT OFFICE.

JOHN D. HARTWIG, OF OLEAN, NEW YORK.

SAW SET AND JOINTER.

Application filed January 17, 1924. Serial No. 686,868.

*To all whom it may concern:*

Be it known that JOHN D. HARTWIG, a citizen of the United States, residing at Olean, in the county of Cattaraugus and State of New York, has invented certain new and useful Improvements in Saw Sets and Jointers, of which the following is a specification.

This invention relates to new and useful improvements in saw sets and jointers and has for its principal object to provide a simple and efficient means for use in connection with circular saws for jointing and setting the same the device being of such a construction as to enable the same to be readily adjustable to circular saws of various diameters.

Another important object of the invention is to provide a combined saw set and jointer of the above mentioned character wherein the saw blade carriage may be adjusted longitudinally to the desired position and held in such adjusted position against the possibility of accidental displacement.

A further object of the invention is to provide a combined saw set and jointer of the above mentioned character wherein means is provided for preventing the saw blade from moving upwardly when the same is in position upon the saw blade carriage.

An equally important object of the invention is to provide a combined saw set and jointer wherein means is provided for holding the saw blade in operative relation with respect to the jointer and which will enable the teeth of the saw blade to be readily and efficiently set and jointed.

Another important object of the invention is to provide a combined saw set and jointer which is simple in construction, inexpensive, strong and durable and well adapted for the purpose for which it is designed.

Other objects and advantages of this invention will become apparent during the course of the following description.

Figure 1:
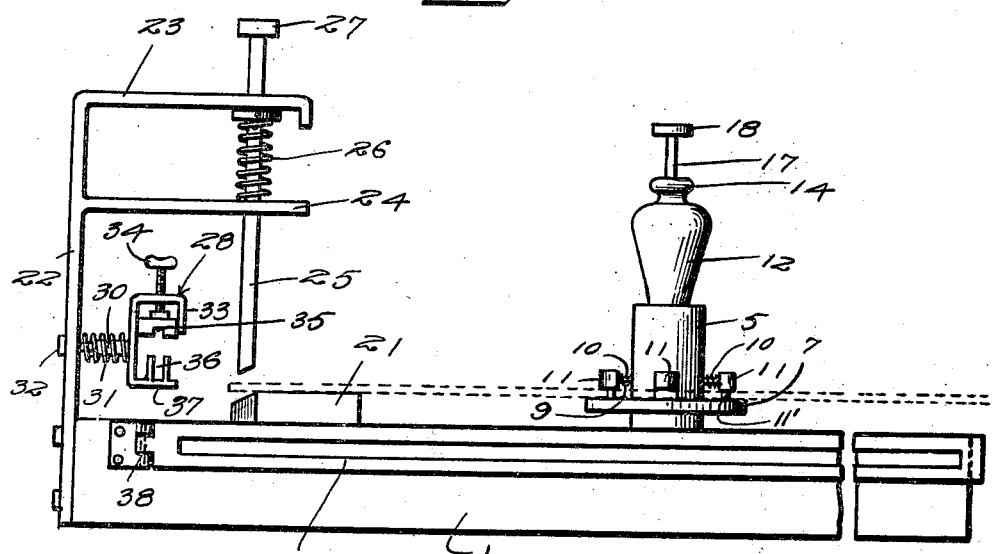
Figure 2:
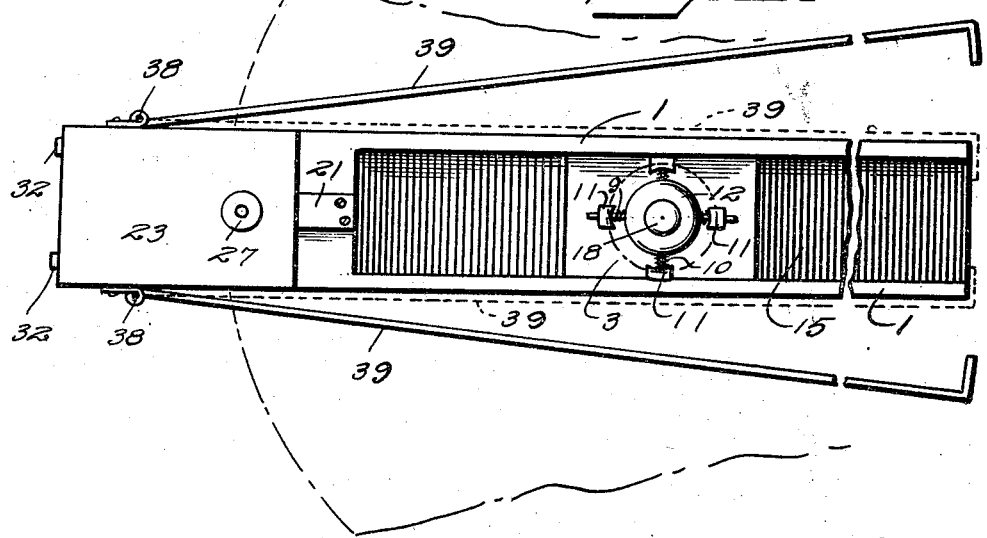

In the accompanying drawings forming a part of the invention and in which like numerals designate like parts throughout the same, Figure 1 is a side elevation of my invention, Figure 2 is a plan view thereof, Figure 3 is a longitudinal section of the device, Figure 4 is a transverse section taken on line 4—4 of Fig. 3, Figure 5 is a horizontal sectional view taken on the line 5—5 of Fig. 3.

In the drawings wherein for the purpose of illustration is shown the embodiment of my invention, the numeral 1 designates the elongated base and the base is open at its forward end and closed at its rear end. The base is furthermore provided with a cut out portion so as to produce a substantially U-shaped construction in cross section as shown in Fig. 4 of the drawing. The sides of the base 1 are provided with longitudinally extending grooves 2 arranged in the inner faces thereof, and the purpose of these longitudinally extending grooves is to provide a means for supporting the carriage 3. The carriage 3 is adapted to be slidably mounted or supported in the base 1 and suitable means is provided in connection with the carriage and the base for holding the carriage in its adjusted position. This construction will hereinafter be more fully described.

The carriage 3 has extending upwardly therefrom the post 5 and this post 5 is provided with an internally threaded neck portion as shown at 6, and the purpose of this arrangement will also be hereinafter more fully described. Provided on the post 5 adjacent the upper end thereof is the collar 7 and this collar 7 provides a means for supporting the circular saw 8 when the same is placed over the post 5 by the central opening of the saw blade to fit over the post.

Extending radially from the post 5 and preferably adjacent the upper end thereof are the sliding fingers 9. Any number of these fingers 9 may be provided, and as fully shown in the drawing, these fingers are normally held in an inoperative position by means of the coil spring 10. It is to be further understood that the fingers 9 are provided with enlarged heads which are square in cross section as shown at 11, and these enlarged heads 11 are normally adapted to lie flush with the outer face of the post 5. The inner ends of the fingers 9 extend into the upper hollowed out portion of the post 5 and are adapted to be engaged by the expansion bolt 12. This expansion bolt is provided with a conical body portion and terminates into a threaded shank 13 which cooperates with the threaded neck portion 6 of the post, and as the bolt 12 is threaded into the neck portion 6 by means of the knob 14 provided on the upper end of the bolt, the conical body portion will engage the fingers 9 at their rear ends and cause the same to be moved radially outwardly into an operative position, so that the square outer end 11 of the fingers will engage the upper face of the saw blade 8 when the same is in position on the collar 7, it being of course understood that the circular saw blade 8 is first placed upon the post 5 when the fingers are in their normal retracted position and the bolt is removed or not in position in the upper end of the post.

The fingers 11 are further provided with downwardly extending shoulders 11' for engagement with the edge of the opening provided in the circular saw blades. The outer face of each shoulder is substantially curved to conform to the configuration of the central opening in the blade. The shoulders 11' will be adapted to fit any size opening in the saw blade by tightening the expansion bolt 12. In this manner the shoulders 11' will hold the saw blade against rotation while in position on the supporting collar 7.

The base 1 is provided with a series of transversely extending corrugations shown at 15 in the drawings and the purpose of these corrugations 15 is to provide a means for cooperating with a locking finger 16 which is formed on the lower end of the elongated rod 17 which extends vertically through the bolt 12 in the manner clearly shown in the drawing, and this elongated rod 17 has its upper end threaded and adapted to receive a suitable handle 18 for actuating the rod. For normally keeping the locking fingers 16 on the lower end of the rod 17 in engagement with the corrugations 15, I provide a coil spring 19 which is disposed between the locking fingers and the lower portion of the carriage 3, whereby the fingers at all times are held in engagement with the corrugations. It is of course to be understood that the rod 17 will extend through the carriage and also the bolts and post. The purpose of this is to provide a means for holding the carriage in adjusted position after the same has been moved longitudinally within the base 1 and for further assuring the carriage from casual displacement from its adjusted position, the carriage may be provided with suitable set screws 20 which are adapted to extend through the carriage and into the base 1 thereby providing additional means for holding the carriage in its predetermined position.

Mounted on the upper face of the base 1 adjacent the rear end thereof is the anvil 21. The anvil 21 is adapted to cooperate with the collar 7 provided on the post 5 for supporting the circular saw blades in position on the base and carriage respectively, the anvil 21 being so mounted as to support the peripheral edge of the saw blade.

Extending upwardly from the rear end of the base 1 is the frame 22. The upper end of the frame 22 terminating into an inwardly extending arm 23. A similar arm 24 is also mounted on the frame 22 and these arms 23 and 24 are provided with registering apertures therein for the purpose of receiving the punch 25. The punch 25 is of the usual construction and adapted to co-operate with the anvil 21 when the saw blade is in position and resting on the anvil so that the punch will engage the teeth of the saw and set the same properly. Normally the punch is held in an inoperative position by means of a coil spring 26 which is supported between the arms 23 and 24 and encircles the upper portion of the punch 25. The upper end of the punch 25 is provided with the usual enlarged head 27 for preventing the possibility of the punch becoming disengaged from its supported position.

In use, as a saw set, the saw blade is adapted to be rotated so that the teeth are successively brought into engagement on the anvil 21 and in line with the punch 25. The carriage and the post with the saw blade mounted thereon may be moved longitudinally on the base to adjust the tooth properly upon the working face of the anvil 21 and beneath the working end of the punch 25.

The frame 22 is furthermore provided with spaced brackets 28 and 29, and as the construction of these brackets are alike, it will only be necessary to describe one of the brackets to suffice for the description of both. Each bracket comprises an arm 30 which is slidably mounted in a suitable aperture provided in the frame and is held in its normally extended position by means of the coil spring, it being understood that the free end of the arm 30 is provided with an enlarged head 32 for preventing the accidental displacement of the bracket from its supported position on the frame. The upper end of each bracket is provided with a downwardly extending flange 33, and adapted to be supported in the flanged upper end 33 of each bracket is the adjustable member 34. The inner face of the adjustable member 34 is provided with a slot 35, and this slot 35 is adapted to co-operate with a guide member 36 carried by the lower portion 37 of the bracket for receiving the edges of a file. The adjustable member 34 is of such a construction as to enable the same to be moved vertically in the upper portion of the bracket but will be prevented from rotating in the bracket by having its sides engaging the flange portion 33 and the inner wall of the bracket.

In use, the file is adapted to extend across the brackets 28 and 29 and be disposed in the guides provided therefor and by tightening on the adjustable member 34, the file is properly positioned so that the same will accurately set the points of the saw blade when the same is brought into engagement with the jointing file. It will thus be seen that by providing a frame including a base in the manner heretofore set forth for the purpose of holding a jointing file, the teeth of the saw blade will be successively brought into engagement with the saw file and will assure the proper dressing of the teeth in an even manner. When it is desired to release the saw blade from the carriage, it is only necessary to remove the rod 17 from the bolt 12 so that the saw blade carriage may be moved away from the frame 22 and by removing the bolt 12 the coil spring will cause the finger 9 to be brought inwardly so that the circular saw blade 8 may be easily removed from the post 5, and then be in position for sharpening so as to enable the same to be ready for use.

Pivotally mounted on the sides of the base 1 as shown at 38 in the drawings are the elongated arms 39. These are adapted to have their free ends engage the forward end of the base and thereby lock the same in position thereon. The purpose of these hinged arms is to provide a means for use in connection with the setting of cross cut saws which are straight. The arms are furthermore so arranged on the base so as not to interfere with the proper operation with the working on a circular saw when the latter is supported on the post.

The simplicity of my device enables the same to be easily and quickly adjusted to the proper position and furthermore does not require the necessity of having to employ a number of complicated parts in order to obtain the necessary results and far more time will be saved by using a device of the above mentioned character than has heretofore been accomplished by the devices now in use for the same purpose.

Furthermore by providing a combined saw set and jointer of the above mentioned character, a device has been provided which is inexpensive and highly efficient in its use, both as a saw set and as a jointer and which will enable the saw to be readily used for either purpose.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to without departing from the spirit or sacrificing any of the principles of the invention.

I claim—

1. A device of the class described comprising a base, a carriage longitudinally adjustable on said base, a post extending upwardly from said carriage, the upper end of said post being hollow and terminating into an internally threaded neck portion, means on the outer face of said post for supporting a saw blade, fingers extending radially from the upper end of said post and adapted to engage the upper face of said saw blade for holding the same against upward movement on said post, means for normally holding said fingers in an inoperative position, and a bolt adapted to be threaded into the internally threaded neck portion of said post for holding said fingers in an extended operative position.

2. A device of the class described comprising an elongated base, being substantially U-shaped in cross section, the sides of said base being provided with longitudinally extending grooves in the inner face thereof, a carriage slidably mounted in said grooves, a post extending upwardly from said carriage, means thereon for supporting a saw blade, means associated with said post for holding a saw blade against upward and rotative movement on said post, means for holding said carriage in a predetermined position on said base, said means comprising a series of corrugations provided in said base, and a spring pressed member extending through said carriage and said post and provided with fingers at its lower end for engagement with said corrugations.

3. A device of the class described comprising a base, a carriage movable longitudinally thereon, a post extending upwardly from said carriage, means associated with said post and carriage for holding the same in a predetermined position on said base, means on said post for supporting a saw blade, a series of radially extending fingers mounted in the upper end of said post, means for normally holding said fingers in an inoperative position, and means in the upper end of said post for forcing said fingers outwardly after the saw blade is in position on said post to engage the upper face thereof.

In testimony whereof I affix my signature.

JOHN D. HARTWIG.